(12) United States Patent
Sanders et al.

(10) Patent No.: US 7,096,048 B2
(45) Date of Patent: Aug. 22, 2006

(54) PORTABLE COMMUNICATIONS DEVICE

(76) Inventors: Donald T. Sanders, 2309 W. Morris St., Indianapolis, IN (US) 46221; Sherri Sherrod, 3102 N. Olney St., Indianapolis, IN (US) 46218

( * ) Notice: Subject to any disclaimer, the term of this patent is extended or adjusted under 35 U.S.C. 154(b) by 478 days.

(21) Appl. No.: 10/404,160

(22) Filed: Apr. 1, 2003

(65) Prior Publication Data
US 2004/0198391 A1 Oct. 7, 2004

(51) Int. Cl.
*H04M 1/00* (2006.01)

(52) U.S. Cl. ............... 455/569.1; 499/979.2; 381/338

(58) Field of Classification Search ............ 455/556.1, 455/557, 569.1, 579.1, 579.2, 579.6, 90.3, 455/550.1; 381/338, 325, 376–379, 381; 379/431–433, 428
See application file for complete search history.

(56) References Cited

U.S. PATENT DOCUMENTS

| | | | |
|---|---|---|---|
| 5,008,864 A | | 4/1991 | Yoshitake |
| 5,881,149 A | | 3/1999 | Weatherill |
| 5,890,074 A | * | 3/1999 | Rydbeck et al. ............ 455/558 |
| 6,035,035 A | | 3/2000 | Firooz |
| 6,078,803 A | | 6/2000 | Martinez |
| 6,112,103 A | * | 8/2000 | Puthuff ....................... 455/557 |
| 6,192,253 B1 | | 2/2001 | Charlier et al. |
| 6,212,414 B1 | | 4/2001 | Alameh et al. |
| 6,223,029 B1 | * | 4/2001 | Stenman et al. ............ 455/420 |
| 6,278,873 B1 | | 8/2001 | Itakura et al. |
| 6,285,757 B1 | | 9/2001 | Carroll et al. |
| 6,314,184 B1 | | 11/2001 | Fernandez-Martinez |
| D453,751 S | | 2/2002 | Bearden |
| 6,351,629 B1 | * | 2/2002 | Altschul et al. ........... 455/90.1 |
| 2002/0103014 A1 | | 8/2002 | Hutchison et al. |
| 2002/0164953 A1 | | 11/2002 | Curtis |
| 2003/0022690 A1 | | 1/2003 | Beyda et al. |
| 2003/0125097 A1 | | 7/2003 | Anlauff |
| 2004/0063475 A1 | | 4/2004 | Weng |
| 2004/0067785 A1 | | 4/2004 | Lillie |
| 2004/0185915 A1 | | 9/2004 | Ihara et al. |

* cited by examiner

*Primary Examiner*—Pablo N. Tran
(74) *Attorney, Agent, or Firm*—Bose McKinney & Evans LLP

(57) ABSTRACT

A portable communications device having a base that can be worn on the user's wrist, a wireless earpiece that can be concealed when worn, and a novel audio link that allows the earpiece to communicate with the base. Each audio link is programmed to communicate with any base unit of the present invention but with only one earpiece. The audio links and earpieces can be packaged and sold together, and the base units can be packaged and sold separately. The base includes a novel keypad having keys that are positioned around the periphery of the base in a sequence which matches that used on old rotary dial phones and which allows the user to access the keys without having to look at them. The earpiece includes the microphone into which the user talks. The microphone can easily detect and transmit the user's voice, yet is mostly concealed from passersby. Thus, the user can use the portable communications device while conducting other activities but without making it obvious to observers that he or she is using the device.

2 Claims, 9 Drawing Sheets

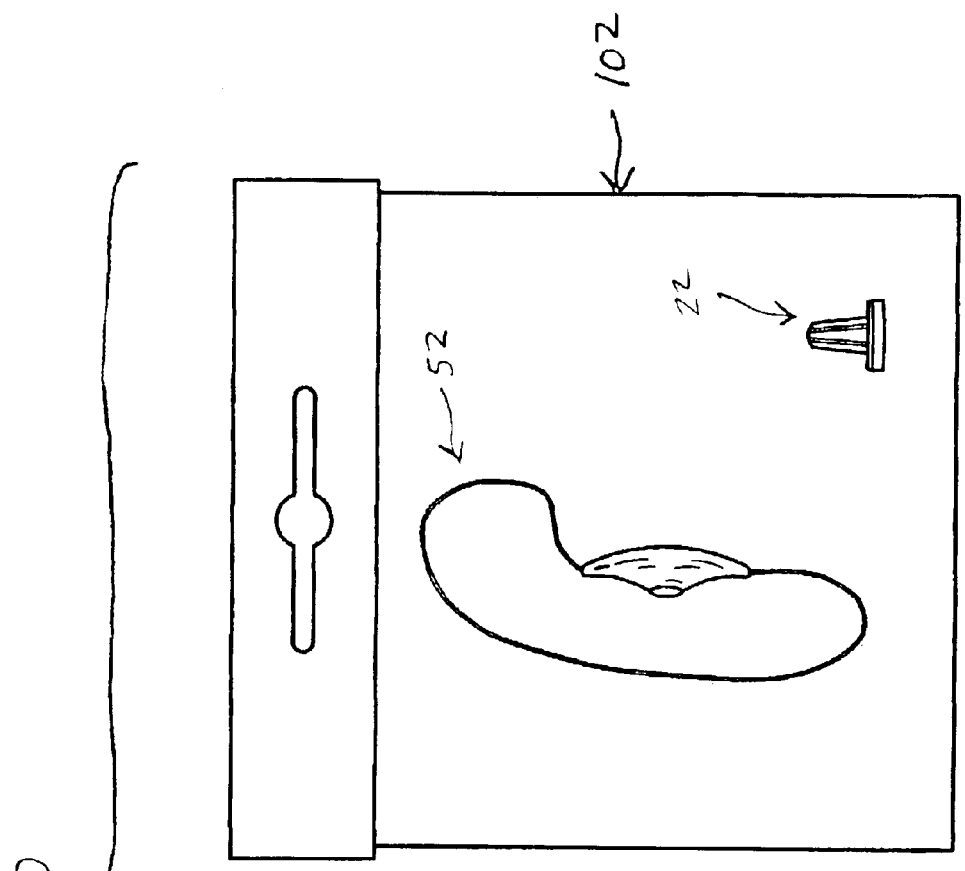
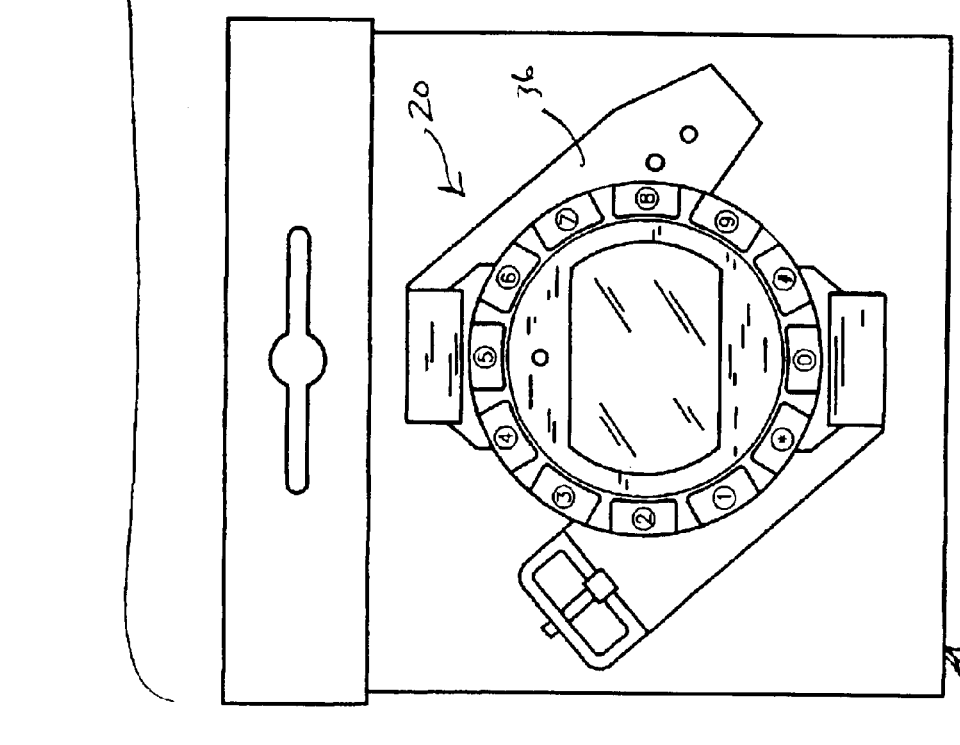
FIG. 9A
FIG. 9B

PORTABLE COMMUNICATIONS DEVICE

FIELD OF THE INVENTION

The present invention relates to portable communications devices and more specifically to a communications device which can be worn by the person using it.

BACKGROUND OF THE INVENTION

Alexander Graham Bell was awarded U.S. Pat. No. 174,465 for a telephone in 1876. Over the next century, telephones became smaller and easier to operate. Cellular phones originated in 1947, when researchers looked at crude mobile (car) phones and realized that by using small cells (range of service area) and reusing frequencies they could increase the traffic capacity of mobile phones. By 1987, cellular telephone subscribers exceeded one million. Personal Communication Services (PCS) differ from cellular in that they use a different radio frequency and generally use all-digital technology for transmission and reception. Portable communications devices continue to improve.

Notwithstanding these improvements, however, the most popular portable telephones have several drawbacks, especially if the user is using the device while conducting other activities. For example, using a cellular phone when operating a motor vehicle can be dangerously distracting. Most cellular phones require one hand of the user to hold the phone close to the user's face and ear. Further, when dialing the number or answering the phone, the user must use his or her sight to identify specific buttons to be pressed to answer or place the call, whichever the case may be.

Furthermore, modern telephones have become sufficiently portable that "multi-tasking" while talking on the phone has become desirable and commonplace. Various activities can be conducted while talking on the phone, such as cooking, cleaning, driving, walking the dog and sports activities, to name just a few. However, having to hold the phone hinders most of these activities. Further, it is desirable to increase the number and type of activities that can be easily accomplished while talking on the phone.

It is known in the art to provide a wrist carried telephone that is operable without removal from the user's wrist and examples of the same are disclosed by U.S. Pat. No. 6,212,414 (Alameh et al.), U.S. Pat. No. 6,192,253 (Charlier et al.) and U.S. Pat. No. 5,881,149 (Weatherill). These patents also disclose ear pieces that are worn by the user to obviate the need to hold the handset next to one's head. U.S. Pat. No. 6,278,873 (Itakura et al.) discloses a wristwatch-type communication device suitable for use in a radio paging receiver. U.S. Pat. No. 6,314,184 (Fernandez-Martinez) discloses a bracelet telephone that includes a terminal mounted to a bracelet. A ring shaped part couples to one finger of the user and supports an earphone connected by an electric cable. U.S. Pat. No. 6,285,757 (Carroll et al.) discloses a wristwatch-type device with a retractable earbud and a microphone.

One disadvantage of the devices disclosed above is that the earpiece may become lost or broken, thereby requiring the user to replace the entire device. Such an approach is undesirably expensive and wasteful if the base unit is still operable. Another disadvantage of the above-noted devices is that their keypads are often too small for average sized fingers to operate efficiently and are arranged in an awkward location on the devices. The above-described devices also suffer from the drawback that they are not entirely "hands-free." For example, many of the ear pieces disclosed above must be wired to the main unit. The connecting wires may become tangled or interfere with the user's movement.

Many modern cellular or portable phones are now configured with headsets. The advantage of these headsets, of course, is that they free up the user's hands to accomplish other tasks. While practical, however, these headsets are perceived by many users as unsightly, and many users feel awkward or even foolish when wearing them in public.

It is desirable to have an improved portable communications device that overcomes all of the drawbacks noted above.

SUMMARY OF THE INVENTION

The present invention provides a portable communications device having a base that can be worn on the user's wrist, a wireless earpiece that can be concealed when worn, and a novel audio link that allows the earpiece to communicate with the base. Each audio link is programmed to communicate with any base unit of the present invention but with only one earpiece. As a packaging concept, the audio links and earpieces can be packaged and sold together, and the base units are sold separately. Thus, the present invention offers modular capabilities. If an earpiece is lost, the user simply purchases another earpiece along with a new audio link, rather than having to replace the entire unit.

Devices in accordance with the present invention may be used while performing most tasks without interference. Sudden or abrupt movements do not present a problem. Thus, sports such as basketball, golf, weightlifting and the like can all be easily performed while using devices in accordance with the present invention.

In one form thereof, the present invention provides a portable communications device. The device includes a base having a viewing window, a port and a keypad. An earpiece is associated with the base. An audio link is detachably received in the port and the audio link communicably links the earpiece to the base when the audio link is installed in the port.

In a preferred form, the base of the communications device includes a camera. The camera can take the picture of the person talking into the device and transmit the same to the display of another user using another device. The other device can be in accordance with the present invention or any other telephone.

In another preferred form, the keypad of the communications device is formed of a series of keys disposed about the periphery of the base. More preferably, the keys are positioned in the sequence 0, *, 1, 2, 3, 4, 5, 6, 7, 8, 9, # when read sequentially around the periphery of the base. This matches the key sequence used on old rotary dial phones and serves a familiar sequence of numbers that users can access by feel without having to look at the numbers. Furthermore, as noted above, many prior art wristwatch-type communications devices have a rectangular array of keys that are too small to conveniently access by average size fingers. By placing the keys around the outside periphery of the base unit, the keys can be formed larger and are thus more easily accessible and usable without looking at them.

In another preferred form, the communications device further includes an accessory that can be connected to the base. In one embodiment, the accessory is a charger to which the base can be docked and which can be inserted into a cigarette lighter (adapter) of an automobile. More preferably, the base includes an auxiliary key pad or even a keyboard that can be used in parallel with or in lieu of the keys provided on the base. In another embodiment, the accessory can be configured to be inserted into a standard 120 VAC electrical outlet.

Another key advantage of the present invention is that the earpiece includes both the speaker that transmits sound to the user and the microphone that transmits the sound of the user's voice to the base, which in turn transmits a signal to another device. On the other hand, the circuitry that operates the device is housed in the base, such that the earpiece can be made small and inconspicuous. When the earpiece is worn, the microphone extends slightly downward and forward of the user's ear lobe, which for the average user represents a distance of only 4–5 inches to the center of the user's mouth. Thus, the microphone can easily pick up the user's voice from this distance, yet is not easily detectable by passersby. Thus, a user may be communicating with a device according to the present invention while conducting other activities. Yet, there are no unsightly headsets or other items that may make the user feel uncomfortable using the device in a public setting.

BRIEF DESCRIPTION OF DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein:

FIGS. 9A and 9B are top views illustrating the packaging concept in accordance with the present invention.

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
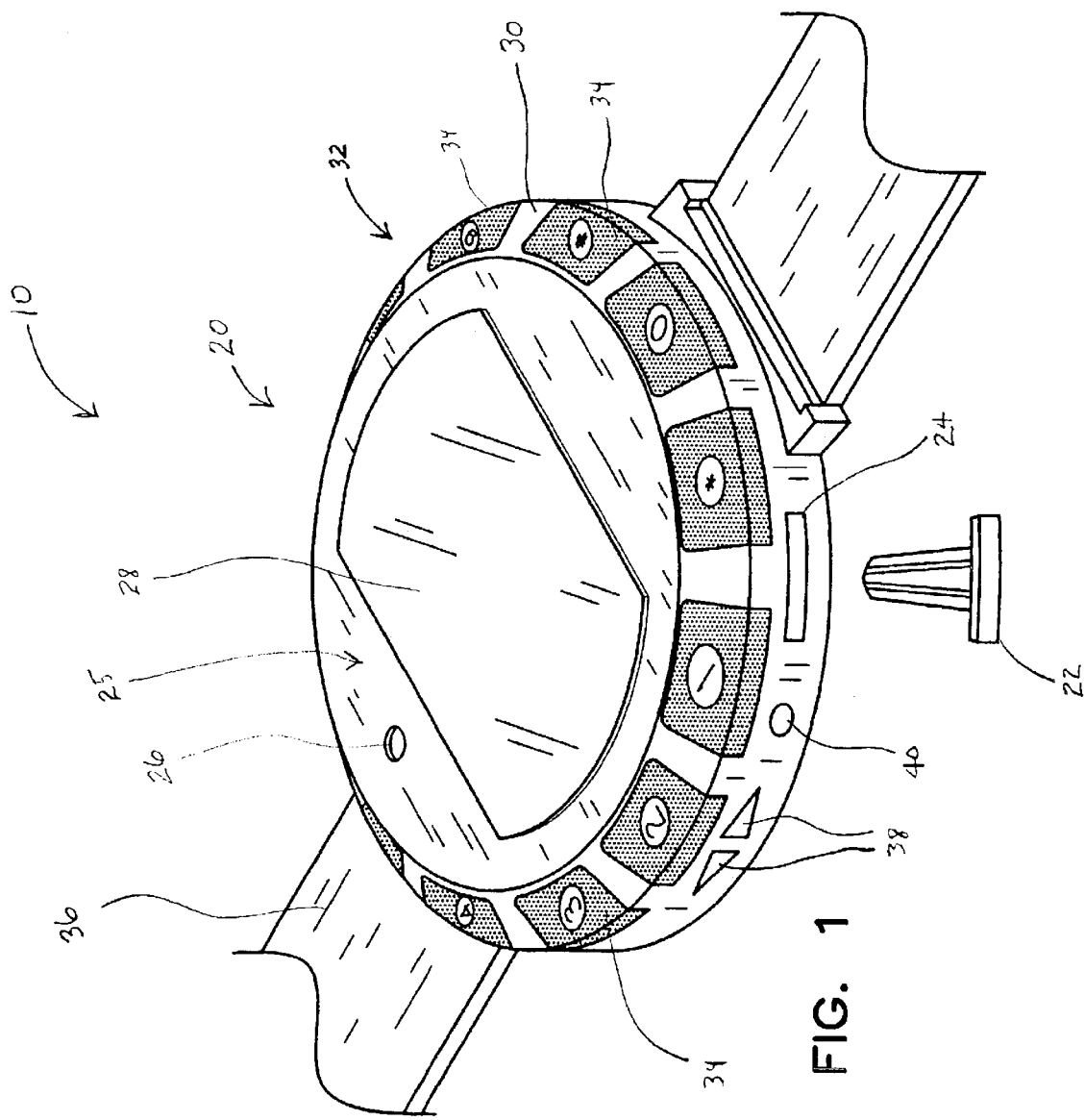
FIG. 1 is a perspective view of a base unit in accordance with one embodiment of the present invention, illustrating an audio link exploded away from the base.
Figure 4:
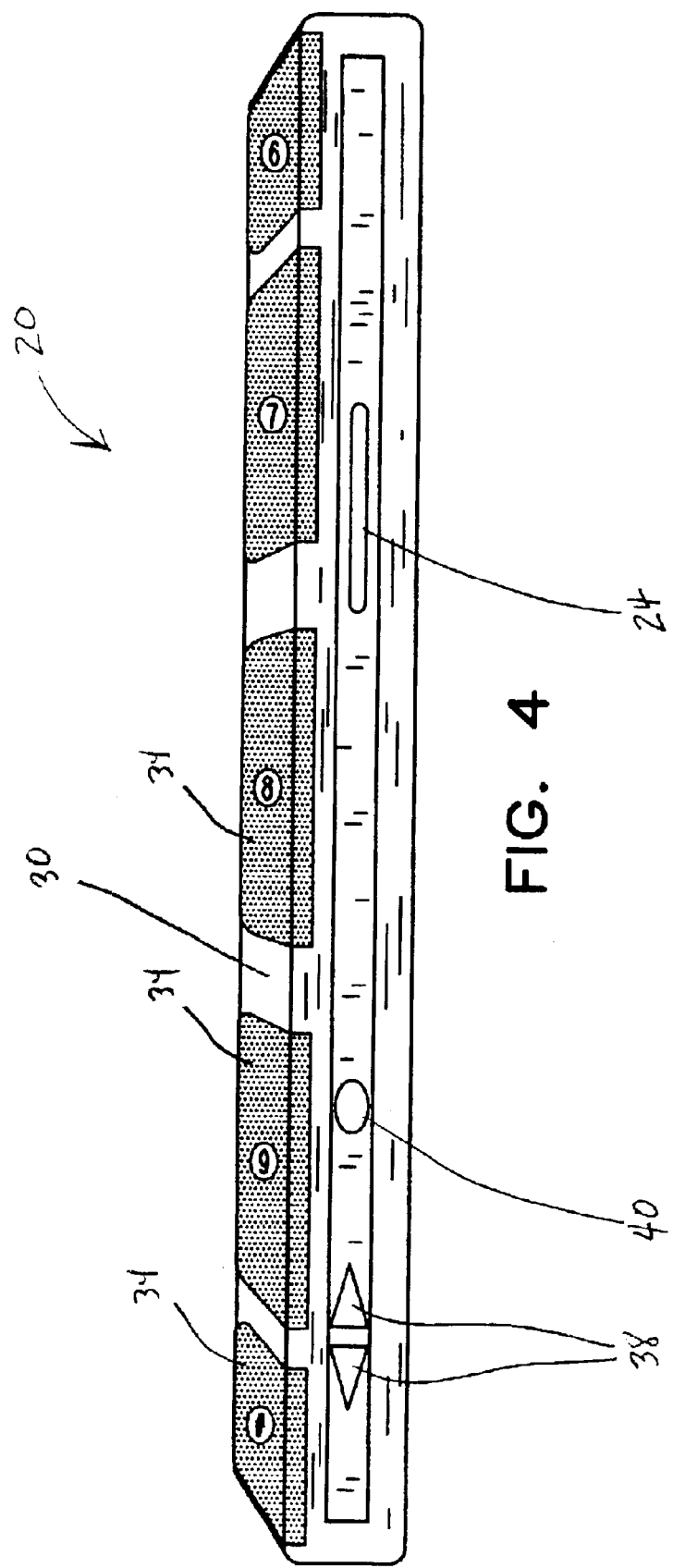
FIG. 4 is a side view of the base shown in FIG. 1.
Figure 7:
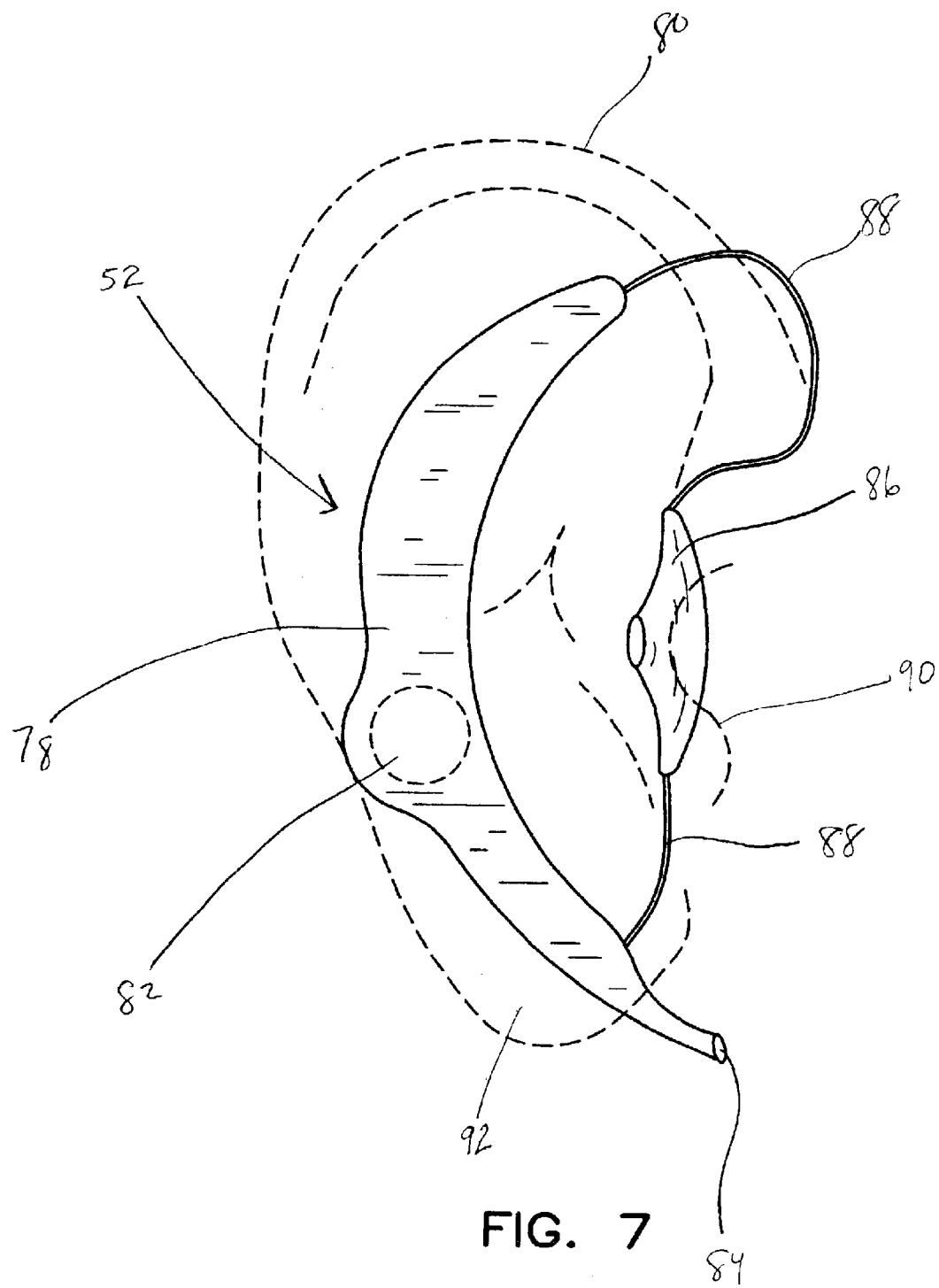
FIG. 7 is an elevational view of an earpiece in accordance with an embodiment of the present invention, illustrating the relationship to the user's ear (shown in phantom) when worn.
Figure 8:
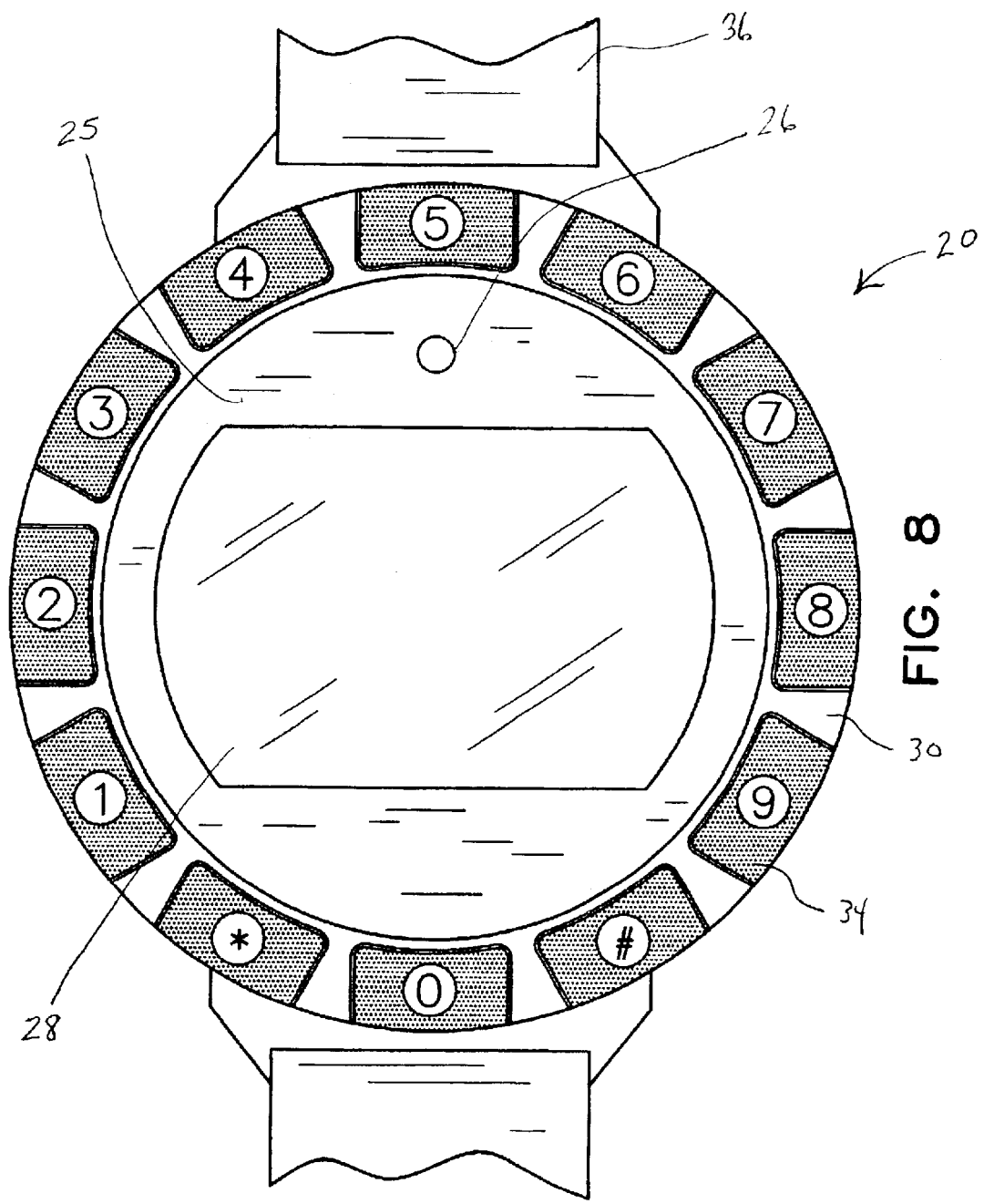
FIG. 8 is a top view of the base shown in FIG. 1.

Referring now to FIGS. 1, 4 and 8, the communications device 10 of one preferred embodiment includes base 20 and audio link 22 that is detachably mountable in port 24 and earpiece 52 (see FIG. 7). Base 20 includes a face 25 on which camera 26 and display window 28 are provided as shown. Optionally, a cover that flips open (not shown) may be provided for face 25. Base 20 also includes a bezel 30 which is angled relative to face 25 and on which is provided a keypad 32 made up of several keys 34 disposed about the periphery of base 20. Conveniently, keys 34 are positioned on bezel 30 in the sequence 0, *, 1, 2, 3, 4, 5, 6, 7, 8, 9, # when read sequentially. This sequence is the same as provided on older rotary telephones and is familiar to many users. Alternatively, the keys may be arranged in any of a variety of sequences. By placing the keys 34 on the angled bezel 30 at the outside periphery of base 20, the size of keys 34 is maximized so that in turn the user may easily access them by feel. The angle on which keys 34 are positioned also helps in this regard. Base 20 also includes a wristband 36 as is known in the art. Auxiliary keys 38 and 40 are provided on the side of base 20 and can perform any number of functions to operate the portable communications device as required.

Figure 2:
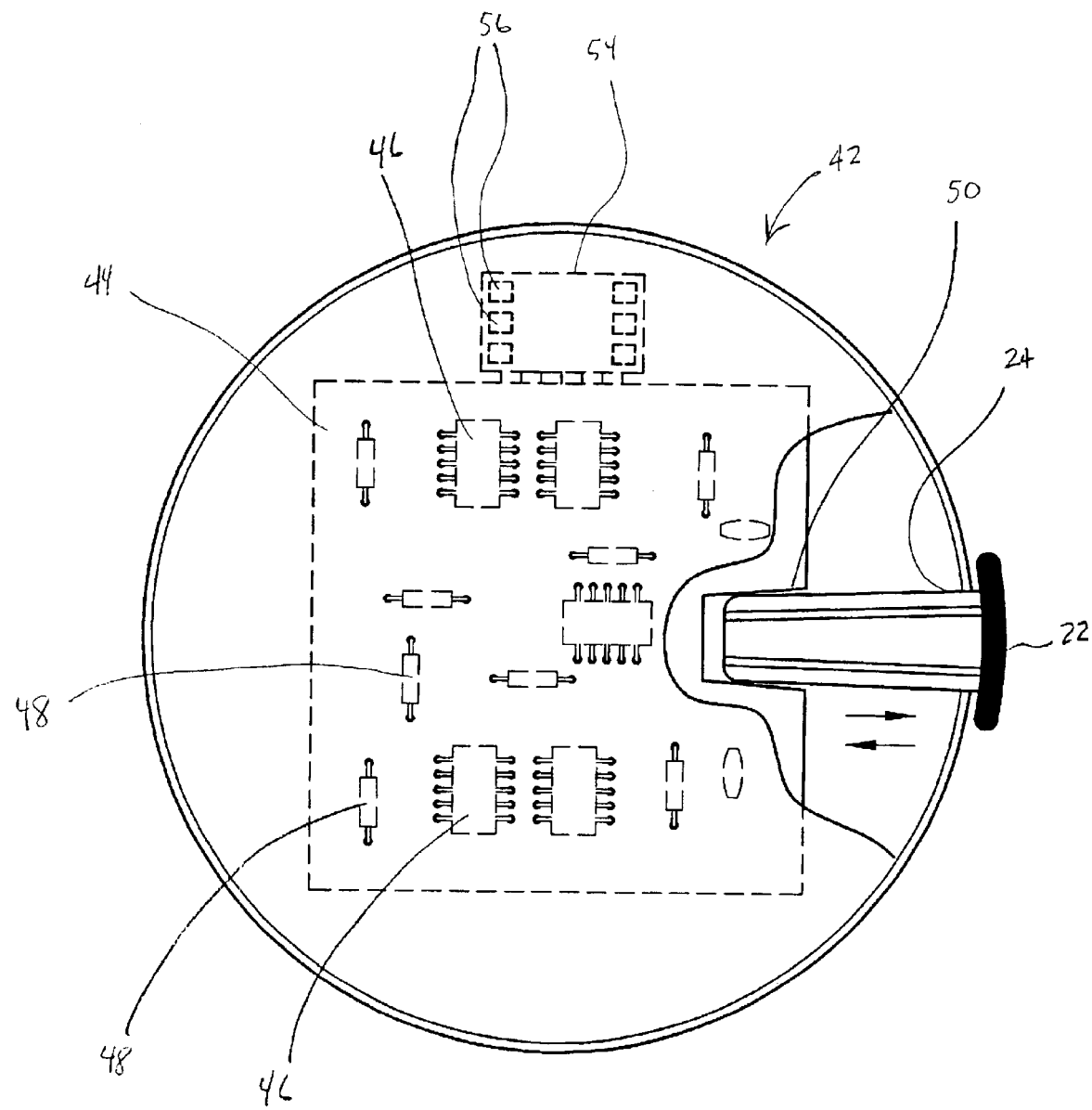
FIG. 2 is a top view of a circuit board that is housed centrally in the base unit of FIG. 1 and also illustrates the audio link locked into place within the base.

Turning now to FIG. 2, base 20 includes in the illustrated embodiment includes a middle section 42 disposed centrally in base 20. Section 42 includes a small circuit board 44 that includes various integrated circuit (IC) chips 46 and other componentry 48 such as resistors, capacitors and the like. Port 24 leads to a cutout section 50 in board 44 to communicably receive audio link 22. The engagement of audio link 22 into cutout 50 can be a snap-fit engagement as is known in the art, such that audio link 22 is detachably mountable into port 24. Once engaged with board 44, audio link 22 allows the base 20 to communicate with earpiece 52 (see FIG. 7) as described in more detail below. A smaller plate 54 is connected to board 44 and includes sockets 56 that receive legs (not shown) from camera 26, such that camera 26 can commincate its signal to board 44.

Figure 3:
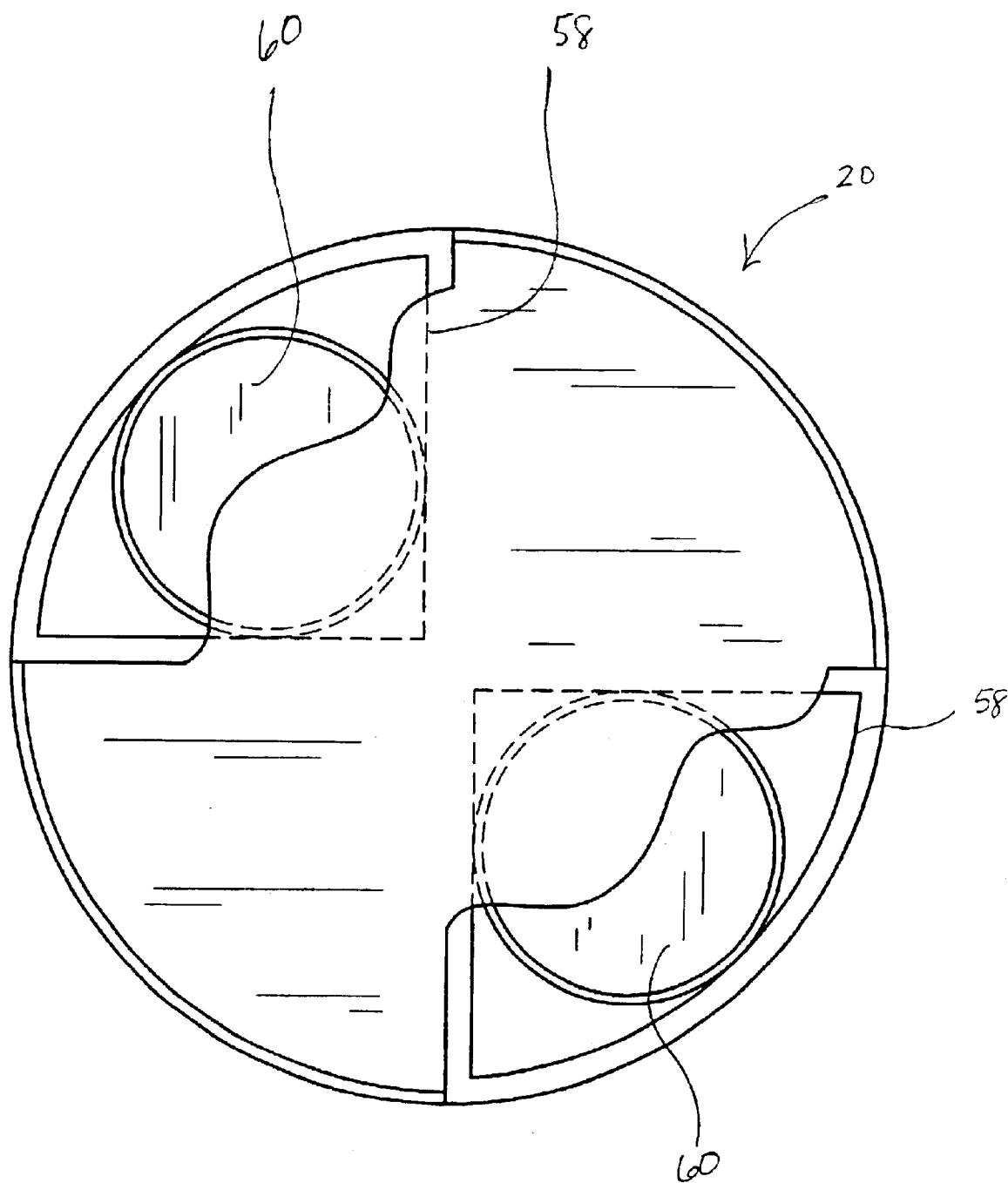
FIG. 3 is a bottom view of the base unit of FIG. 1 which illustrates dual batteries and compartments therefor.

With reference to FIG. 3, the bottom of base 20 includes dual compartments 58 that receive batteries 60. The batteries may be configured in series to provide power to the portable device or may be configured such that one battery serves as a back-up. When the first battery expires, the display 28 may illuminate a signal so that the user knows to replace it. Meanwhile, the portable device 10 may be operated with the back-up battery, thereby avoiding the user not being able to operate the device when the first battery expires.

Figure 5:
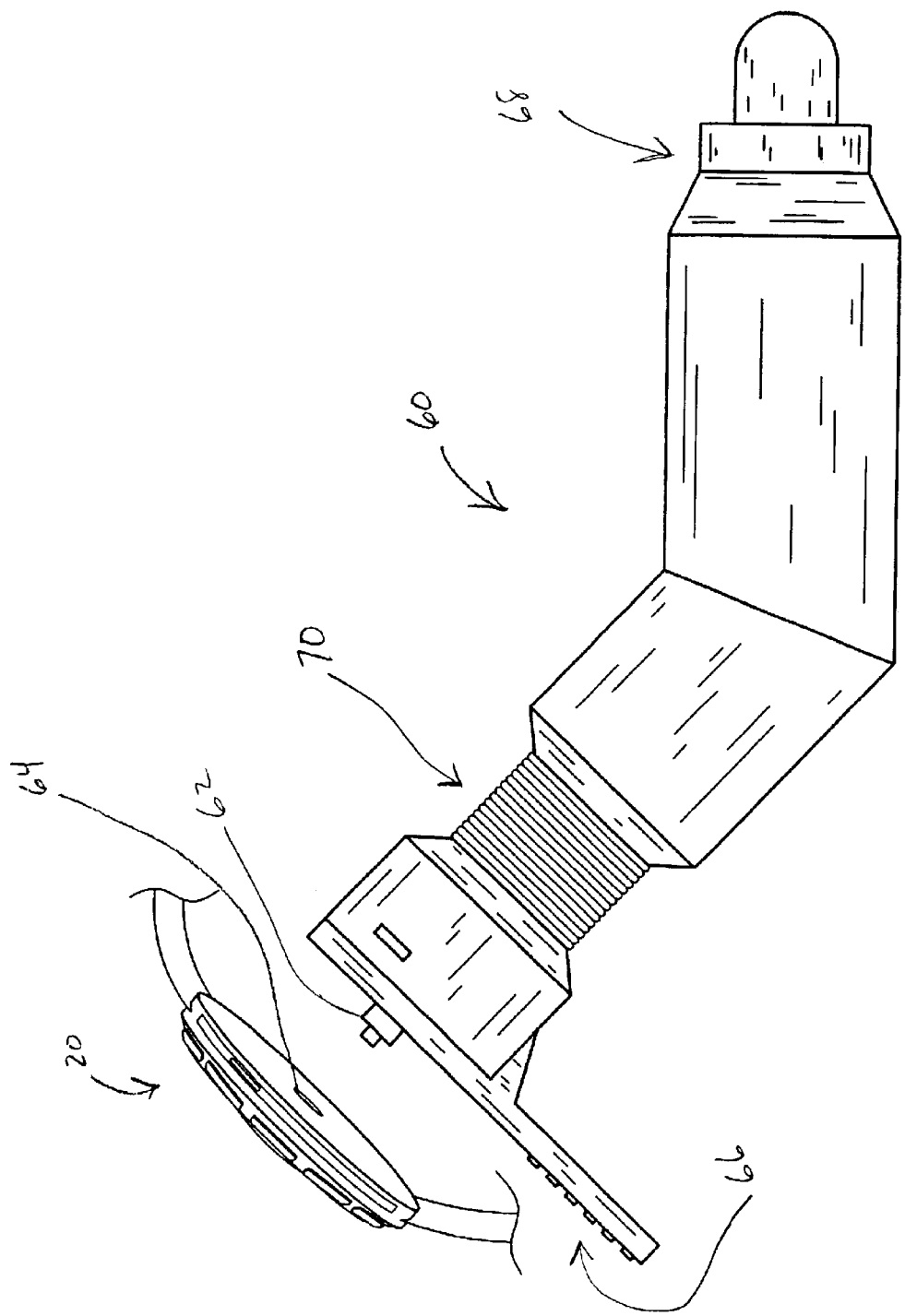
FIG. 5 is a side view of an accessory in accordance with one embodiment of the present invention which shows a base unit like that shown in FIG. 1 that can be docked to the accessory.

FIG. 5 illustrates an accessory 60 to which base 20 may be docked. Accessory 60 includes a male connector 62 that is matingly and detachably received in opening 64 formed at the bottom of base 20. Accessory 20 includes an auxiliary keypad 66 which could be arranged as a standard keyboard for a portable personal computer. Keypad 66 can be configured with larger keys than base 20 and is therefore easier to operate, especially when in a vehicle. Accessory 60 also includes adaptor plug 68 which fits into a standard cigarette lighter or accessory outlet in an automobile. Neck 70 is illustrated as a flexible member that can be bent in all directions and expanded about its longitudinal axis by pulling on it, thereby allowing the user of device 10 to position base 20 optimally in its particular surroundings.

Figure 6:
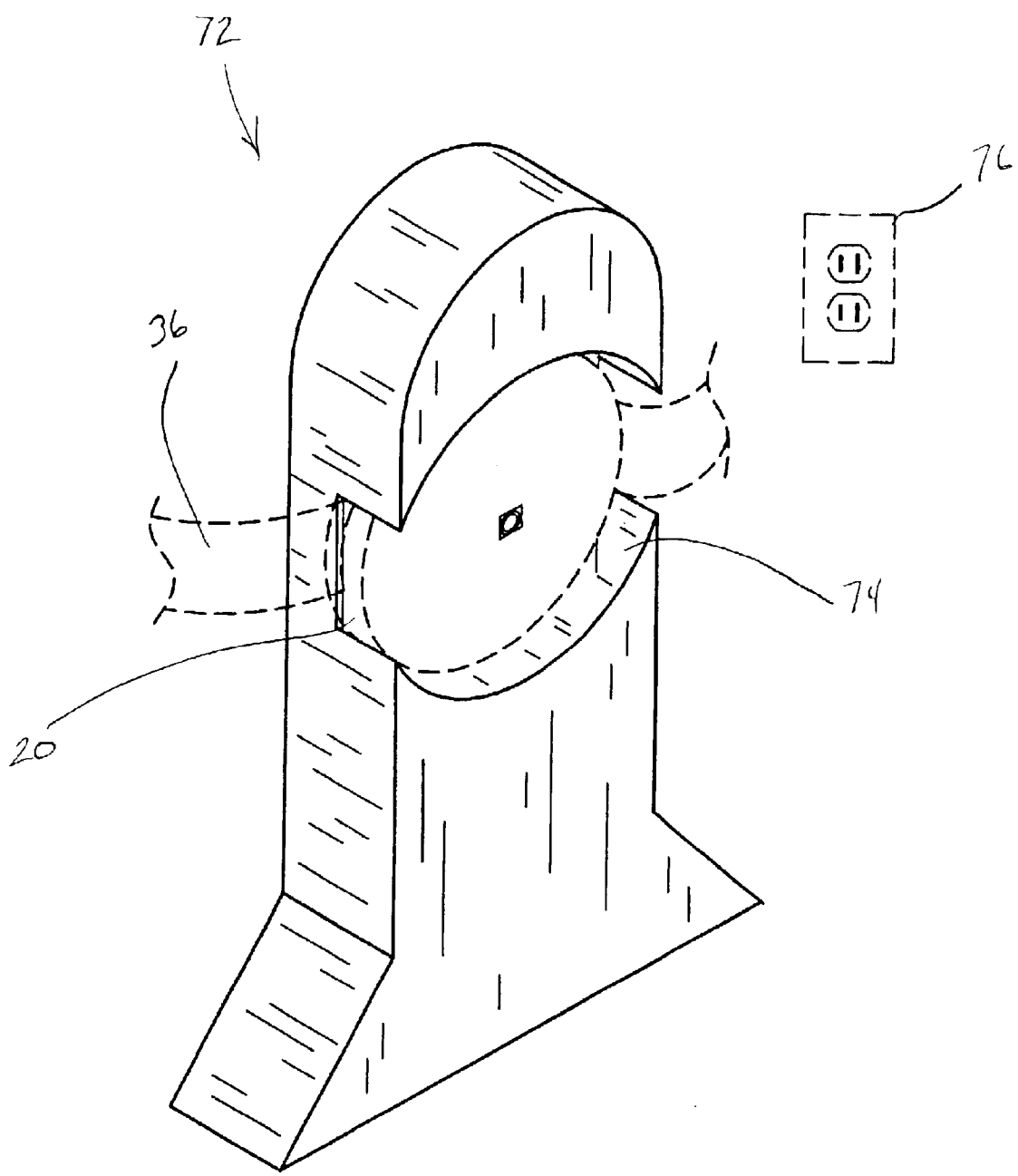
FIG. 6 illustrates an alternate embodiment of an accessory in accordance with the present invention.

Turning now to FIG. 6, accessory 72 includes a receptacle section 74 which allows base 20 (shown in phantom) to be docked thereto in the same fashion described above with reference to FIG. 5. Accessory 72 is designed for rechargeable base units 20. Accessory 72 may be plugged into a wall outlet 76 which will cause base 20 to recharge.

With reference to FIG. 7, a novel earpiece 52 of an embodiment of the present invention can be appreciated. Earpiece 52 includes a flexible housing 78 that fits around the back of the user's ear 80 (shown in phantom). Housing 78 should fit comfortably behind the user's ear, much like a large hearing aid. Housing 78 is preferably stuffed with soft foam or other material to give it a soft, comfortable feel. It is also desirable to form the outer surface of housing 78 with a material that is comfortable when worn against the skin and there are a wide variety of materials that perform suitably in this regard, such as cotton or synthetic cloth, plastics, rubber, and the like. A small battery 82 is provided in housing 78 and powers microphone 84 and speaker 86, which are described in more detail below.

Wire 88 connects speaker 86 to housing 78 and allows sufficient flexibility such that the user may position speaker 86 behind his or her tragus 90 of ear 80, thereby at least partially concealing speaker 86. Wire 88 may be made up of a metallic core around which is wrapped soft material that feels smooth to the skin and is thus comfortable to the wearer. One of ordinary skill in the art would recognize many suitable materials for wire 88. Advantageously, earpiece 52, when worn by the user, is almost totally concealed. Only a portion of the speaker 86 projects beyond the user's tragus 90 and the microphone extends only slightly beyond the user's ear lobe (lobule) 92.

One advantage of embodiments incorporating the present invention relates to the specific means the earpieces 52 are configured to communicate with the audio links 22 and the packaging of the same. As shown in FIGS. 9A and 9B, base 20 is packaged in package 100 whereas audio link 22 and earpiece 52 are packaged together in package 102, separate from package 100. In the illustrated embodiment, audio link 22 is programmed or configured to only communicate the earpiece 52, with which it is packaged. This can be done by selecting a specific frequency or coding scheme known in the art. On the other hand, audio link 22 can communicate with any base 20 manufactured in accordance with the illustrated embodiment. Optionally, earpiece 52 may be configured with a small pager button that when depressed, communicates a signal to audio link 22, which in turn causes an audible signal to be emitted from base 20 when audio link 22 is inserted therein. A misplaced base 20 can thereby be easily located.

Thus, FIGS. 9A and 9B illustrate a method of manufacturing and packaging portable communications devices 10 from a plurality of bases 20, a plurality of earpieces 52, and a plurality of audio links 22, any one of the plurality of audio links being detachably mountable to any one of the plurality of bases. The method includes the steps of first selecting a first audio link 22 from the plurality of audio links and selecting a first earpiece 52 from the plurality of earpieces 52. As noted above, the first audio link 22 is programmed to communicate with all bases 20 when mounted thereto. One or both of the first earpiece 52 and the first audio link 22 are programmed such that the first earpiece 52 is communicably linked to the first audio link 22, but cannot communicate with any other audio link 22. The previous steps are then repeated for the remainder of the plurality of audio links and earpieces, thereby generating a plurality of pairs of associated earpieces and audio links (package 102). Again, the bases 20 are packaged separately in package 100. Thus, one can combine any package 102 with any package 100 to produce an activated portable communications device 10, as shown with reference to FIGS. 9A and 9B.

While a preferred embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of manufacturing a plurality of portable communications devices from a plurality of bases, a plurality of earpieces, and a plurality of audio links, any one of the plurality of audio links being detachably mountable to any one of the plurality of bases, said method comprising:

(a) selecting a first audio link from the plurality of audio links and selecting a first earpiece from the plurality of earpieces;

(b) programming the first audio link to communicate with each one of the plurality of bases when mounted thereto;

(c) programming one of the first earpiece and the first audio link such that the first earpiece is communicably linked to the first audio link;

(d) repeating steps (a)–(c) for the remainder of the plurality of audio links and earpieces, thereby generating a plurality of pairs of associated earpieces and audio links; and (e) combining any one of the plurality of the pairs with any one of the plurality of the bases to produce an activated one of the plurality of communications devices.

2. The method of claim 1, further comprising packaging the plurality of pairs separately from the plurality of bases.

* * * * *